United States Patent
Hood

(10) Patent No.: US 8,554,028 B2
(45) Date of Patent: Oct. 8, 2013

(54) UPSTREAM FIBER OPTIC COUPLERS AND METHODS FOR POWER SPLITTING PASSIVE OPTICAL NETWORKS

(75) Inventor: David Hood, Palo Alto, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 422 days.

(21) Appl. No.: 12/908,202

(22) Filed: Oct. 20, 2010

(65) Prior Publication Data

US 2012/0099814 A1  Apr. 26, 2012

(51) Int. Cl.
  *G02B 6/28*  (2006.01)
  *G02B 6/26*  (2006.01)
  *G02B 6/36*  (2006.01)
  *H04J 14/02*  (2006.01)

(52) U.S. Cl.
  USPC ............... 385/24; 385/31; 385/47; 385/92; 385/93; 398/83

(58) Field of Classification Search
  USPC ........... 385/24, 31, 39, 47, 51, 52, 88–93; 398/79–83, 98–103
  See application file for complete search history.

(56) References Cited

U.S. PATENT DOCUMENTS

| 4,479,697 A | 10/1984 | Kapany et al. |
| 4,739,501 A | 4/1988 | Fussganger |
| 5,861,966 A | 1/1999 | Ortel |
| 2004/0013360 A1 | 1/2004 | Smets |

FOREIGN PATENT DOCUMENTS

| EP | 0 003 575 A2 | 8/1979 |
| EP | 0 160 574 A2 | 11/1985 |

OTHER PUBLICATIONS

"Passive Optical Network." Wikipedia, the Free Encyclopedia. Web. Sep. 3, 2010. <en.wikipedia.org/wiki/Passive_optical_network>. 7 pp.
"Fiber Optic Couplers." Repair and Maintenance Manuals—Integrated Publishing. Web. Sep. 3, 2010. <http://www.tpub.com/neets/tm/108-11.htm>. 3 pp.

*Primary Examiner* — Uyen Chau N Le
*Assistant Examiner* — Michael Mooney

(57) ABSTRACT

A fiber optic coupler includes a housing that receives upstream optical signals from drop optical fibers that are optically coupled to optical network units in a power splitting passive optical network and provides an aggregate upstream optical signal to a trunk optical fiber that is optically coupled to an optical line terminal in the power splitting passive optical network, without having passed through a power splitter. At least one reflector and/or refractor in the housing is oriented to reflect and/or refract at least one upstream optical signal from at least one of the drop optical fibers, so as to produce the aggregate upstream optical signal for the trunk optical fiber. Various configurations of reflectors and/or refractors may be provided. Relative methods are also disclosed.

8 Claims, 6 Drawing Sheets

UPSTREAM FIBER OPTIC COUPLERS AND METHODS FOR POWER SPLITTING PASSIVE OPTICAL NETWORKS

TECHNICAL FIELD

Various embodiments described herein relate to fiber optic couplers and, more particularly, to fiber optic couplers for power splitting passive optical networks

BACKGROUND

A power splitting Passive Optical Network (PON) is a point-to-multipoint, fiber to the premises network architecture in which unpowered optical splitters or couplers are used to enable a single optical fiber, commonly referred to as a "trunk fiber" to serve multiple premises, typically 32-128 premises, which are connected to the optical splitters or couplers via "drop" fibers. The unpowered optical splitters or couplers conventionally are fused fiber optic splitters or couplers in which optical fibers are fused together to provide power splitting. A power splitting PON includes an Optical Line Terminal (OLT) at the service provider's central office, and a number of Optical Network Units (ONUs) near end users.

A power splitting passive optical network configuration can reduce the amount of fiber and central office equipment that may be needed compared with various point-to-point architectures. Downstream signals from an optical line terminal are power split to provide a number of reduced power downstream signals to a number of optical network units by sharing a single trunk fiber to broadcast the reduced power downstream signals to the respective premises. Encryption may be used to prevent eavesdropping. Upstream signals from a number of optical network units to an optical line terminal are combined using a multiple access protocol, which may be a time division multiple access (TDMA) protocol. The optical line terminal may avoid contention by providing timeslot assignments to the respective optical network units for upstream communication.

SUMMARY

Fiber optic couplers according to various embodiments described herein include a housing that is configured to receive a respective plurality of upstream optical signals from a respective plurality of drop optical fibers that are coupled to a respective plurality of optical network units in a power splitting passive optical network. The housing may also be configured to provide an aggregate upstream optical signal to a trunk optical fiber that is optically coupled to an optical line terminal in the power splitting passive optical network. At least one reflector and/or refractor is provided in the housing that is oriented to reflect and/or refract at least one of the plurality of upstream optical signals from the at least one of the plurality of drop optical fibers so as to produce the aggregate upstream optical signal that is provided to the trunk optical fiber. In comparison with a fused fiber optic power splitter, the efficiency of upstream coupling may be improved by reducing upstream coupling power loss.

In some embodiments, the plurality of drop optical fibers and the trunk optical fiber are themselves received in the housing. In other embodiments, intermediate fibers and/or other elements may be used to couple the upstream optical signals and/or the aggregate upstream optical signal to the housing.

Many different configurations of fiber optic couplers may be provided according to various embodiments described herein. For example, in some embodiments, a plurality of reflectors is provided, a respective one of which is oriented to reflect a respective upstream optical signal from a respective one of the plurality of drop optical fibers so as to produce the aggregate upstream optical signal. In other embodiments, a nonplanar reflector is provided that is oriented to reflect the plurality of upstream optical signals from the plurality of drop optical fibers so as to produce the aggregate upstream optical signal. The nonplanar reflector may comprise a curved reflector that is curved in one plane or in two or more nonparallel planes. The nonplanar reflector may also comprise a faceted reflector that is faceted in one plane or in two or more nonparallel planes. Moreover, the plurality of upstream optical signals may be oriented to strike the at least one reflector in a planar array or in a three-dimensional array. In any of the above described embodiments, the at least one reflector can comprise at least one mirror, at least one total internal reflector and/or at least one diffractive optic reflector (for example, an optical grating).

Moreover, some embodiments described herein need not use a reflector with every drop optical fiber. Thus, in some embodiments, at least one upstream optical signal from at least one drop optical fiber is optically coupled to the trunk optical fiber without reflecting from a reflector.

Other components may be added to the fiber optic coupler according to various other embodiments described herein. For example, at least one refractor, such as a lens, may be provided in the housing that is oriented to focus the at least one upstream optical signal that is reflected from the at least one reflector, into the trunk optical fiber. Moreover, in some embodiments, one or more lenses may be provided, and reflectors need not be used. Thus, various combinations of one or more reflectors and/or one or more refractors may be used.

Moreover, in other embodiments, the housing may also include an optical filter and power splitter. The optical filter may be optically coupled between the trunk optical fiber and the power splitter, and may be configured to direct a downstream optical signal from the trunk fiber to the power splitter, and to direct the aggregate upstream optical signal from the at least one reflector/refractor to the trunk optical fiber. The power splitter may be configured to split the downstream optical signal that is received from the optical filter and to direct a respective one of the split downstream optical signals to a respective one of the drop optical filters.

Moreover, in other embodiments, a plurality of second optical filters may also be provided, a respective one of which optically couples a respective one of the drop optical fibers to the power splitter and to the at least one reflector/refractor, and is configured to direct a downstream optical signal from the power splitter to the respective drop optical fiber, and to direct a respective upstream optical signal from a respective drop optical fiber to the at least one reflector/refractor. In other embodiments, the plurality of drop optical fibers may comprise a plurality of upstream drop optical fibers, a respective one of which is optically coupled between a respective one of the optical network units and the at least one reflector/refractor. The housing may also be configured to optically couple a plurality of downstream drop optical fibers to the power splitter, wherein a respective one of the downstream drop optical fibers is optically coupled to a respective one of the optical network units.

In the power splitting optical fiber network, the plurality of upstream optical signals may all be of substantially the same wavelength. Moreover, the downstream optical signal is of a different wavelength from the plurality of upstream optical signals.

Various embodiments described herein can be generalized to provide at least one power splitter in the housing, such as a fused fiber optic splitter, which is configured to power split the downstream optical signal from the trunk optical fiber to produce the split downstream optical signals. At least one other optical component in the housing is configured to combine the plurality of upstream optical signals into the aggregate upstream optical signal without passing through (i.e., bypassing) the at least one power splitter. The at least one other optical component may comprise at least one reflector and/or refractor. The at least one other optical component may be configured to steer and focus the plurality of upstream optical signals into a core of the trunk optical fiber without passing through the at least one power splitter.

Various embodiments described herein can be further generalized to provide fiber optic couplers for applications other than power splitting passive optical networks, that can replace fused fiber optic splitters with one or more optical components that are configured to steer and focus optical signals. More specifically, fiber optic couplers according to these embodiments may include a housing that is configured to position a plurality of input optical fibers and a common output optical fiber in spaced apart relation to one another, to define an optical path between the common output optical fiber and the input optical fibers. At least one optical component is provided in the optical path. The at least one optical component is configured to steer and focus optical signals from the plurality of input optical fibers into a core of the common output optical fiber. The at least one optical component may be configured to reflect and/or refract the plurality of optical signals from the input optical fibers into the core of the common output optical fiber. In some embodiments, the plurality of input optical fibers may comprise a plurality of drop optical fibers of a power splitting passive optical network and the common output optical fiber may comprise a trunk optical fiber in the power splitting passive optical network. The at least one optical component in the optical path may be configured to steer and focus a plurality of upstream optical signals from the drop optical fiber into a core of the trunk optical fiber to produce an aggregate upstream optical signal.

Finally, various embodiments have been described herein in terms of fiber optic couplers. However, other embodiments may provide methods of coupling optical fibers. These methods may comprise reflecting/refracting at least one upstream optical signal from at least one of a plurality of drop optical fibers that are optically coupled to a respective plurality of optical network units in a power splitting passive optical network into a trunk optical fiber that is optically coupled to an optical line terminal in the power splitting passive optical network. For example, a plurality of upstream optical signals from a respective plurality of drop optical fibers that are optically coupled to a respective plurality of optical network units in a power splitting passive optical network may be reflected/refracted into a trunk optical fiber that is optically coupled to an optical line terminal in the power splitting passive optical network. In other embodiments, at least one optical signal from the at least one of the plurality of optical fibers may be directed into the trunk optical fiber without performing the reflecting/refracting. Steering and focusing may be provided and filtering and splitting may be provided as was described above. Various other embodiments may be provided as was described above.

DETAILED DESCRIPTION

Figure 1:
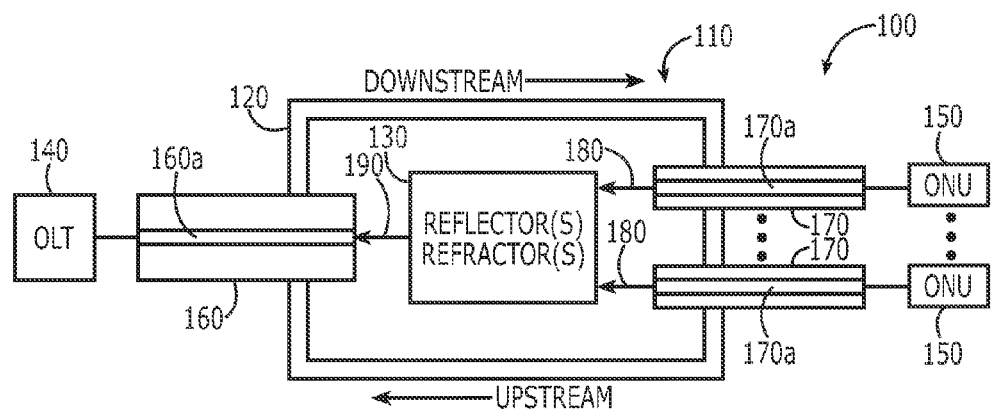
FIGS. 1-9 are schematic cross-sectional views of upstream transmission in power splitting passive optical networks including fiber optic couplers according to various embodiments described herein.

The invention will now be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. For brevity and/or clarity, well-known functions or constructions may not be described in detail.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation.

Finally, although some of the drawings may include arrows on communication paths to show a primary direction of communication, it is to be understood that communication may occur in the opposite direction to the depicted arrows.

FIG. 1 is a schematic cross-sectional view of a power splitting passive optical network including a fiber optic coupler according to various embodiments described herein. Referring now to FIG. 1, a fiber optic coupler 110 according to various embodiments described herein may be used in a power splitting passive optical network 100, which includes an Optical Line Terminal (OLT) 140 and a trunk optical fiber 160 optically coupled thereto. The trunk optical fiber 160 may include a core 160a for the purpose of concentrating and conveying optical power along the length of the fiber. The power splitting passive optical network 100 also includes a plurality of Optical Network Units (ONUs) 150 that are optically coupled to drop optical fibers 170, which may themselves include a core 170a. Two or more ONUs 150 and drop optical fibers 170 may be included, although typically powers of two of these units are included and, in some embodiments, between 32 and 128 ONUs 150 and drop optical fibers 170 are included for a given OLT 140 and trunk optical fiber 160.

Still referring to FIG. 1, the fiber optic coupler 110 includes a housing 120 that is configured to receive a respective plurality of upstream optical signals 180 from a plurality of drop optical fibers 170 that are optically coupled to a respective plurality of ONUs 150 in the power splitting passive optical network 100. The housing 120 is also configured to provide an aggregate upstream optical signal 190 to a trunk optical fiber 160 that is optically coupled to an OLT 140 in the power splitting passive optical network 100. Effective coupling to a fiber generally takes place when both the power of the incoming upstream light beam is concentrated on the core of the trunk fiber, and the angle of incidence is greater than the fiber's critical angle. It will be understood that, as used herein, the term "upstream" means from the ONUs 150 to the OLT 140 (from right to left in FIG. 1), and "downstream" means from the OLT 140 to the ONUs 150 (from left to right in FIG. 1).

Still referring to refer to FIG. 1, at least one reflector and/or refractor 130 is provided in the housing 120. The at least one reflector/refractor 130 is oriented to steer and focus at least one of the plurality of upstream optical signals 180 from the at least one of the plurality of drop optical fibers 170, so as to produce the aggregate upstream optical signal 190 that is provided to the trunk optical fiber 160.

FIG. 1 has been described with respect to a power splitting passive optical network. However, embodiments of FIG. 1, and of the various additional figures to follow, may be used in other optical fiber environments to replace a conventional fused fiber optic splitter. Accordingly, FIG. 1, and the various figures to follow, may also be regarded as describing a fiber optic coupler that comprises a housing 120 that is configured to position a plurality of input optical fibers 170 and a common output optical fiber 160 in spaced apart relation to one another, to define an optical path 180/190 to the common output optical fiber 160 from the input optical fibers 170. At least one optical component 130 is provided in the optical path and is configured to steer and focus optical signals 180 from the input optical fibers 170 into a core 160a of the common output optical fiber 160. The at least one optical component 130 may be configured to reflect and/or refract the optical signals. The optical component 130 can provide an optical power director that is configured for beam steering and focusing. Accordingly, various embodiments described herein may be used to replace the extensive use of fused fiber optic splitters or couplers in various fiber optic networks.

It will be understood that in all embodiments described herein, the trunk optical fiber 160 and/or the drop optical fibers 170 may be directly received within housing 120. However, in other embodiments, the upstream optical signals 180 and the aggregate upstream optical signal 190 may be received in the housing 120 without the need to directly couple the drop optical fibers 170 and/or the trunk optical fiber 160 to the housing 120. Thus, various intermediate elements may be employed in some embodiments.

Various embodiments of fiber optic couplers and methods will now be described in connection with FIGS. 2-9.

Figure 2:
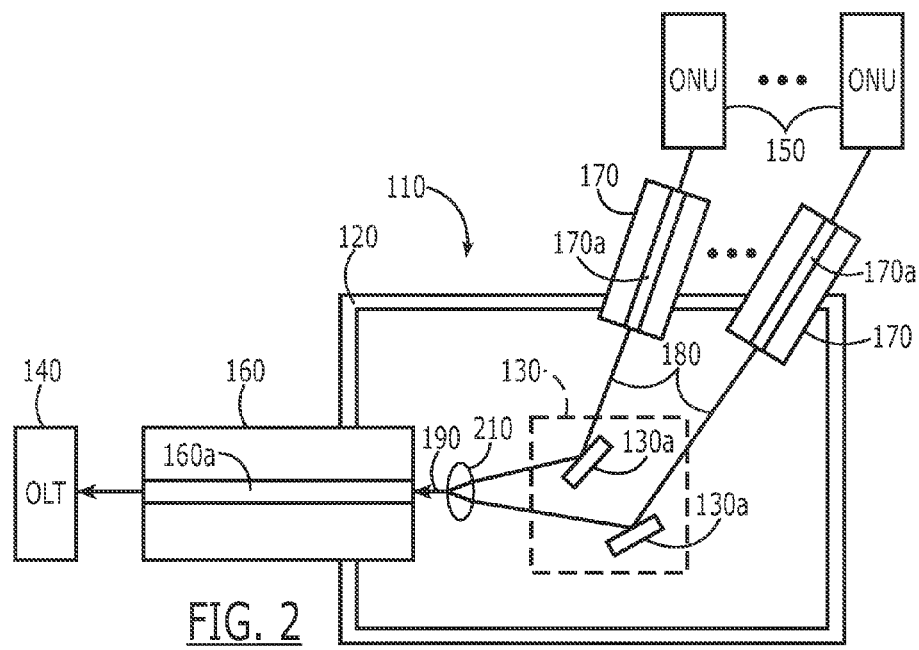

More specifically, FIG. 2 is a schematic cross-sectional view of a fiber optic coupler 110 wherein reflector(s)/refractor(s) 130 comprise(s) a plurality of discrete reflectors 130a, a respective one of which is oriented to reflect a respective upstream optical signal 180 from a respective one of the plurality of drop optical fibers 170 so as to produce the aggregate upstream optical signal 190. In embodiments of FIG. 2, the upstream optical signals 180 may form a divergent beam. Accordingly, a lens 210 may be added between the plurality of discrete reflectors 130a and the trunk optical fiber 160. The lens 210 may be configured to focus the aggregate upstream optical signal 190 onto the core 160a of the trunk optical fiber 160.

Figure 3:
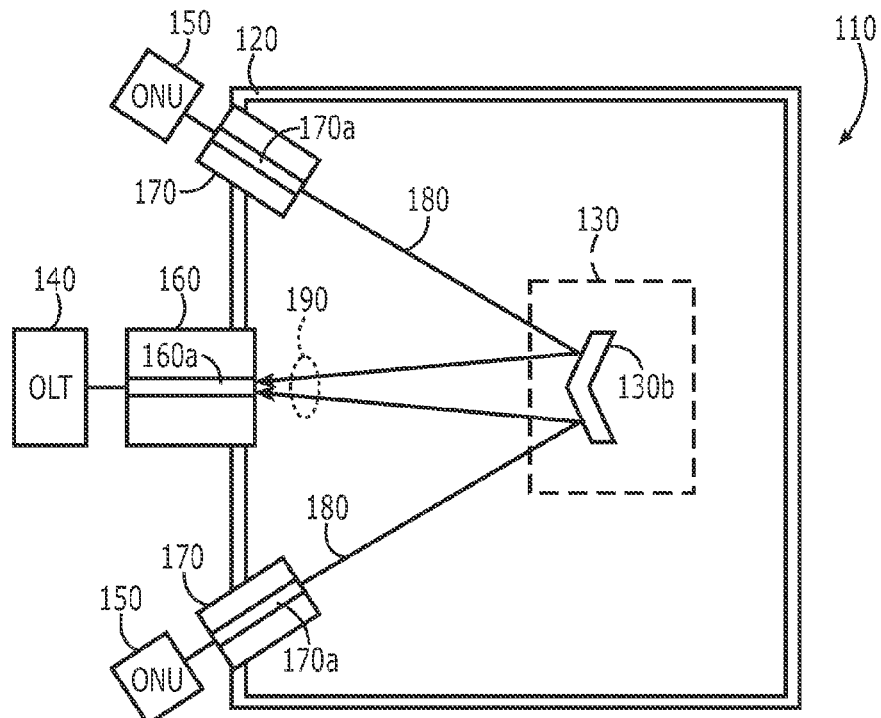

FIG. 3 illustrates other embodiments wherein the at least one reflector/refractor 130 comprises a nonplanar reflector 130b that is oriented to reflect the plurality of upstream optical signals 180 from the plurality of drop optical fibers 170 so as to produce the aggregate upstream optical signal 190. In embodiments of FIG. 3, the nonplanar reflector comprises a faceted reflector. FIG. 3 illustrates a faceted reflector that is faceted in one plane (the plane of FIG. 3). The facets may also extend in two or more nonparallel planes. Thus, the faceted mirrors may be faceted in a three-dimensional structure so that the facets extend along nonparallel planes (i.e., out of the plane of the drawing). The plurality of upstream optical signals 180 may be oriented to strike the at least one reflector 130b in a planar array, as illustrated in FIG. 3, or may be oriented to strike the at least one reflector in a three-dimensional array. In some embodiments, the plurality of drop optical fibers 170 and/or the plurality of upstream optical signals 180 may be radially oriented about the axis of the trunk optical fiber 160 and/or about the aggregate upstream optical signal 190 in a three-dimensional array.

Figure 4:
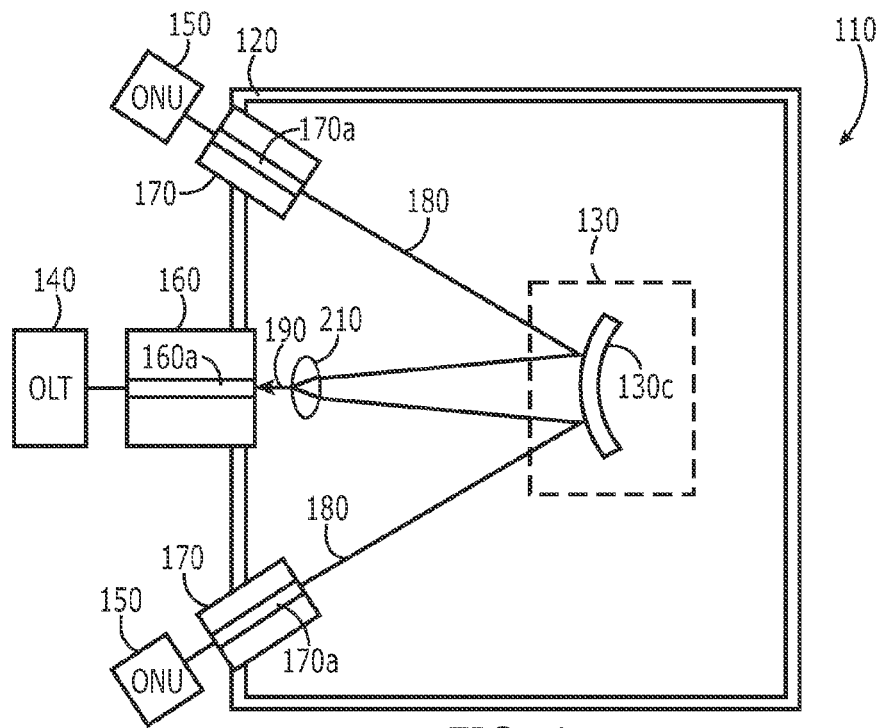

FIG. 4 illustrates other embodiments wherein the reflector/refractor 130 is a curved reflector 130c. The curved reflector 130c may be curved within a plane, such as within the plane of FIG. 4 as illustrated, or may be curved along two or more nonparallel planes, so as to provide a three-dimensional curved reflector, such as a hemispherical, ellipsoidal and/or other sector. The plurality of drop optical fibers 170 and/or the plurality of upstream optical signals 180 may be arranged three-dimensionally about the trunk optical fiber 160 and/or about the aggregate upstream optical signal 190 as was described in above in connection with FIG. 3. A lens may be provided to focus the divergent beams from the curved reflector into the core 160a of the trunk optical fiber.

Figure 5:
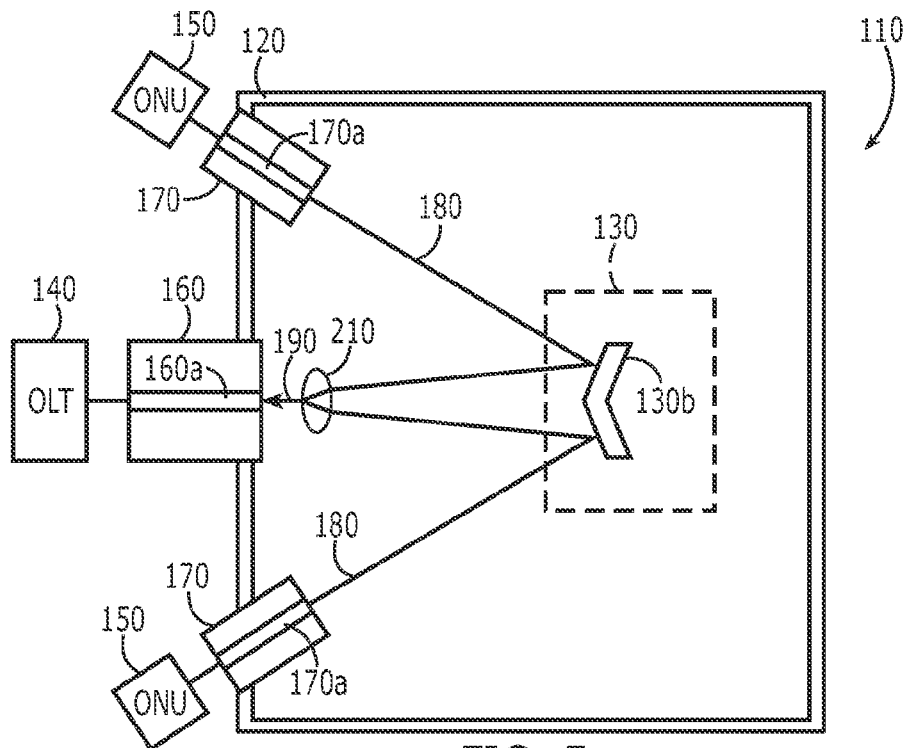

FIG. 5 illustrates other embodiments wherein a lens 210 is provided between the reflector 130b and the trunk optical fiber 160. The lens 210 may be configured to focus the aggregate upstream optical signal 190 onto the core 160a of the trunk optical fiber 160. It will be understood that one or more lenses 210 may be added to any of the embodiments described herein, depending upon the orientation of the various drop fibers 170 and reflector(s) 130 relative to the core 160a of the trunk fiber 160 and/or the amount of beam divergence that is present, so as to increase the focus of the aggregate upstream optical signal 190 into the core 160a of the trunk fiber 160.

Figure 6:
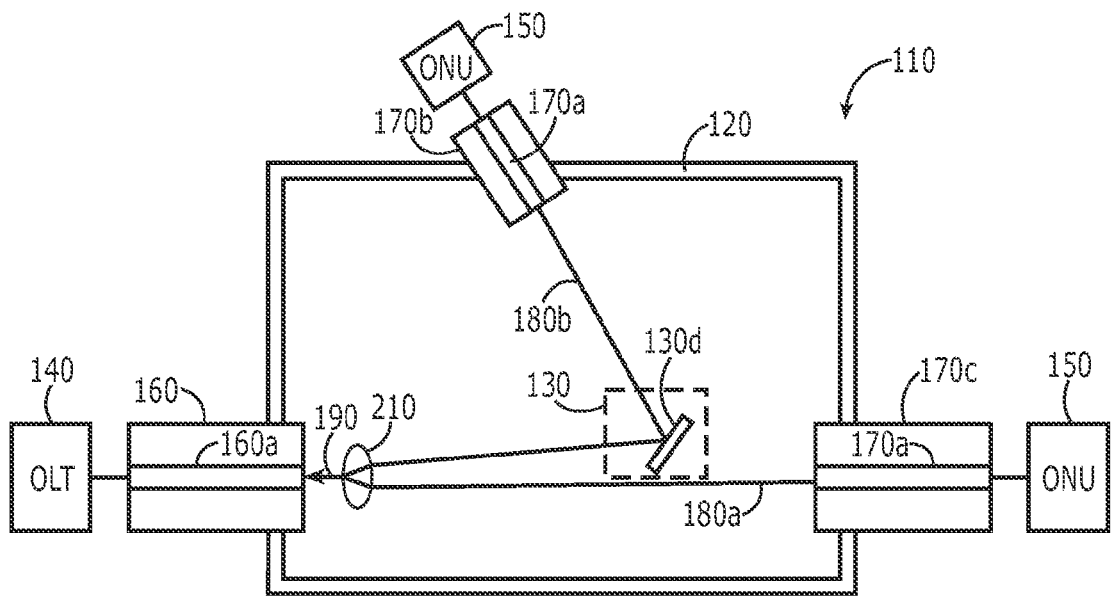

FIG. 6 illustrates other embodiments wherein at least one of the upstream optical signals from at least one of the drop optical fibers need not be reflected. Thus, as shown in FIG. 6, at least one upstream optical signal 180a from a drop optical fiber 170c is not reflected, whereas another upstream optical signal 180b from another drop optical fiber 170b is reflected by a mirror 130d. In other embodiments, more than one upstream optical signal from more than one drop optical fiber may be reflected and/or more than one upstream optical signal from more than one drop optical fiber may not be reflected.

Figure 7:
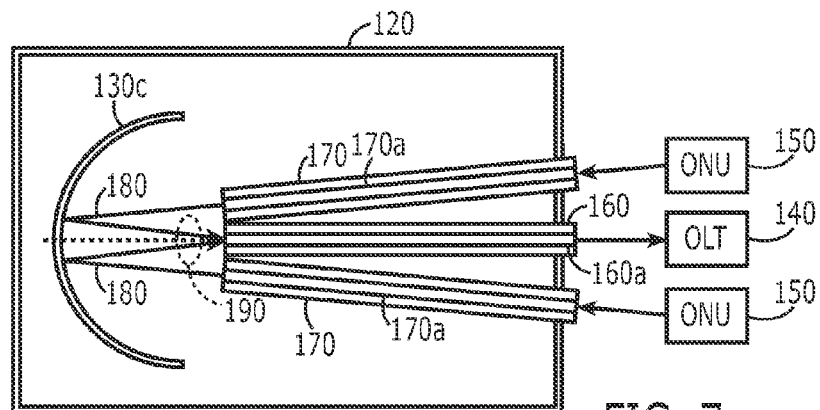

FIG. 7 illustrates yet other embodiments wherein a curved reflector 130c may be used to both direct and to focus a plurality of upstream optical signals 180 from the plurality of drop optical fibers 170, so as to produce the aggregate upstream optical signal 190. Thus, in some embodiments, one or more reflectors can be used to both steer and focus the plurality of upstream optical signals 180 into a core 160a of the upstream optical fiber 160. A lens need not be used.

Figure 8:
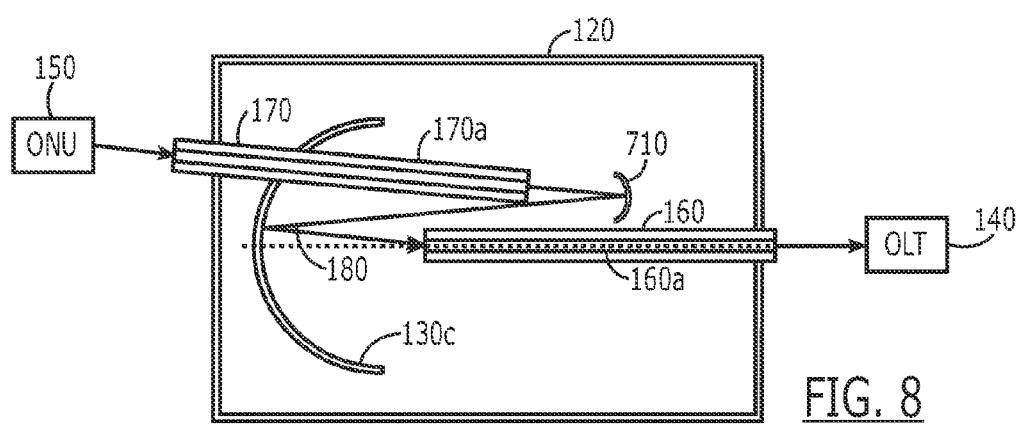

FIG. 8 illustrates other embodiments that use a plurality of reflectors 130c and 710. Although only one drop optical fiber 170 is illustrated for clarity, a plurality of drop optical fibers may be provided. As shown in FIG. 8, and compared with FIG. 7, the additional reflector 710 may be suitably curved and angled to assist in further focusing the beam or in ameliorating the geometrical constraints of a practical implementation. Thus, the reflector 130c may functionally replace the lens 210 of FIG. 3. Accordingly, at least one optical component may be used in order to steer and focus the plurality of upstream optical signals into the core of the trunk optical fiber.

Figure 9:
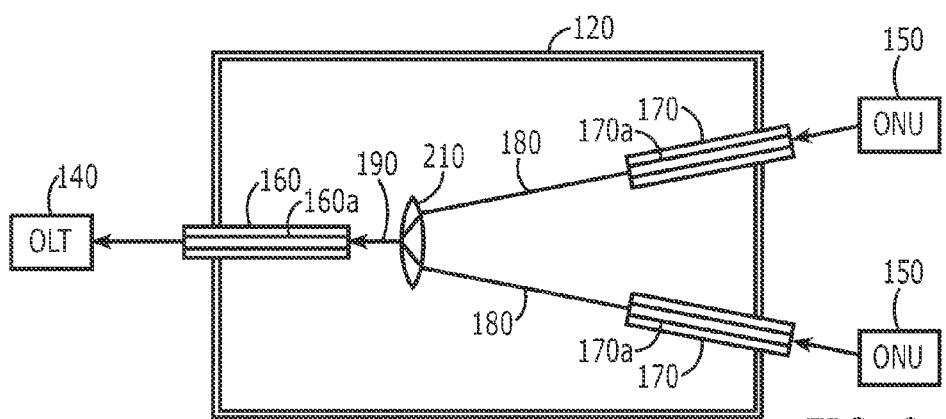

In other embodiments, as illustrated, for example, in FIG. 9, reflectors need not be used. Rather, refractive elements, such as a lens 210 may be used to steer and focus the plurality of upstream optical signals 180 from the plurality of drop optical fibers 170 onto a core 160a of a trunk optical fiber 160. It will be understood that refractors may have more optical loss than is achievable with a reflector, but even these optical losses may be far less than the power of two loss of a multi-stage fused fiber power splitter. Accordingly, at least one optical component may be used in order to steer and focus the plurality of upstream optical signals into the core of the trunk optical fiber.

The reflectors that were illustrated in FIGS. 1-8 are illustrated as conventional mirrors. However, other reflectors may also be used according to various other embodiments described herein, including total internal reflection reflectors, diffractive optic reflectors such as Bragg gratings, and/or other reflectors. Moreover, the refractors that were illustrated in FIGS. 2, 4-6 and 9 have been illustrated as conventional convex lenses. Concave lenses, faceted lenses and/or other configurations of lenses, and/or other refractive elements, may also be used.

Additional discussion of various embodiments of FIGS. 1-9 is now provided. Passive optical networks (PON) have proven to be popular world-wide as a way of extending the high bandwidth of optical fiber to the subscriber ("fiber to the home"), or closer than was feasible before ("fiber to the curb"). In one form of PON, known as a power-splitting PON, equipment at the head end, called the OLT, transmits a downstream optical signal to a plurality of equipments (ONUs) at or near the subscribers' premises. At the optical layer, each ONU receives the entire signal. The ONU then decodes the signal electrically and extracts only the content that it needs. In the upstream direction, each ONU transmits at a separate time, orchestrated by the OLT, such that the transmissions from the various ONUs do not overlap in time. The OLT thus receives the transmission from one ONU at a time, one after another. Examples of power-splitting PON are GPON (ITU G.984), XG-PON (ITU G.987), EPON (IEEE 802.3ah) and 10GEPON (IEEE 802.3av). Other PON technologies are also possible. For example, a Wavelength-Division-Multiplexing (WDM) PON is based on the principle of wavelength splitting and can use different technology from a power splitting PON.

The optical network over which a power splitting PON conducts its transmission is a tree, with its root at the OLT, and the ONUs at the various leaf positions. To serve a plurality of ONUs, the optical tree is split into a number of branches. This is conventionally done at devices called splitters, or power splitters. The basic component of a power splitter is a node that bifurcates one optical input into two optical outputs, each with nominally half of the input power. A number of these simple nodes may be connected in a tree topology to achieve the desired number of outputs, which is normally a power of 2. At the convenience of field deployment factors, the entire split from trunk to leaves can occur in a single device, or several splitters can be connected in series along the branches of the tree.

Each branch of a bifurcation receives only nominally half of the input power, so that for typical PON split ratios of 32, 64 or 128, most of the signal loss is in the splitter. Overcoming this loss may present technical and economic challenges to the components involved, and may limit deployment options to less than many operators would wish.

Conventional power splitters are symmetric. That is, the upstream loss is the same as the downstream loss. Various embodiments described herein arise from recognition that, in the downstream direction, each ONU must be given a share of the total power, so there is little that can be done to ameliorate this power of two loss. The upstream loss, however, is just a loss or an artifact of the technology: it serves no functional purpose.

Various embodiments described herein can provide an optical coupler that can reduce or eliminate the upstream loss of a PON. Although real-world embodiments of the invention would generally introduce some losses that are to be expected in any real-world implementation, they may be far less than those introduced by a conventional multi-stage fused fiber power splitter. Thus, various embodiments described herein can include at least one power splitter, such as a fused fiber power splitter, that is configured to power split the downstream optical signal from the trunk optical fiber to produce the split downstream optical signals, and at least one other optical component that is configured to combine the plurality of upstream optical signals into the aggregate upstream optical signal without passing through the at least one power splitter. The at least one other optical component may include at least one reflector and/or refractor. The at least one other optical component may be configured to steer and focus the plurality of upstream optical signals into the core of the trunk optical fiber without passing through the at least one power splitter.

Various embodiments described herein may be further generalized to provide fiber optic couplers for applications other than power splitting passive optical networks that can replace fused fiber optic splitters with one or more optical components that are configured to steer and focus optical signals. More specifically, fiber optic couplers according to these embodiments may include a housing that is configured to position a plurality of input optical fibers and a common output optical fiber in spaced apart relation to one another, to define an optical path to the common output optical fiber from the plurality of input optical fibers. At least one optical component is provided in the optical path. The at least one optical component is configured to steer and focus optical signals from the plurality of input optical fibers into a core of the common output optical fiber. The at least one optical component may comprise one or more reflectors and/or refractors.

Various embodiments described herein can use one or more reflectors/refractors to physically and spatially terminate a fiber from each of a plurality of ONUs in a way that allows substantially all of its upstream power to be transferred into a single shared trunk fiber toward the OLT.

WDM PON is mentioned above as a technology that does not rely on power splitting. Instead, it uses wavelength-sensitive devices, such as arrayed waveguides (AWGs) to spatially separate the constituent wavelengths of a composite PON signal into their components, wherein each component is then coupled into the distinct fiber that serves one ONU, and in the upstream direction, spatially combine signals from distinct fibers, based on wavelength discrimination, into a single upstream trunk fiber. Existing AWGs can demonstrate the feasibility of terminating a plurality of fibers, one per ONU, in precisely determined physical locations and orientations.

Wavelength-dependent technology is not suitable to spatially separate or combine the upstream signals of a power-splitting PON such as those cited above, because the wavelengths of a power-splitting PON are not precisely controlled, and indeed are all typically the same.

Various embodiments described herein do not rely on wavelength to spatially distinguish signals from the various ONUs. Instead, various embodiments described herein can use a curved (e.g., FIG. 7) or piecewise planar (e.g., FIG. 3) mirror and/or a lens (e.g., FIG. 9) as a way to accept a number of optical inputs and direct them into a single output, which in a telecommunications network embodiment, would be the upstream fiber of a PON.

Various embodiments described above need not address downstream flow. There may be no benefit to be had in the downstream direction, since the nature of conventional PON technologies is that all ONUs receive the downstream signal, which is therefore necessarily divided into small fractional shares of the original launched power.

Figure 10:
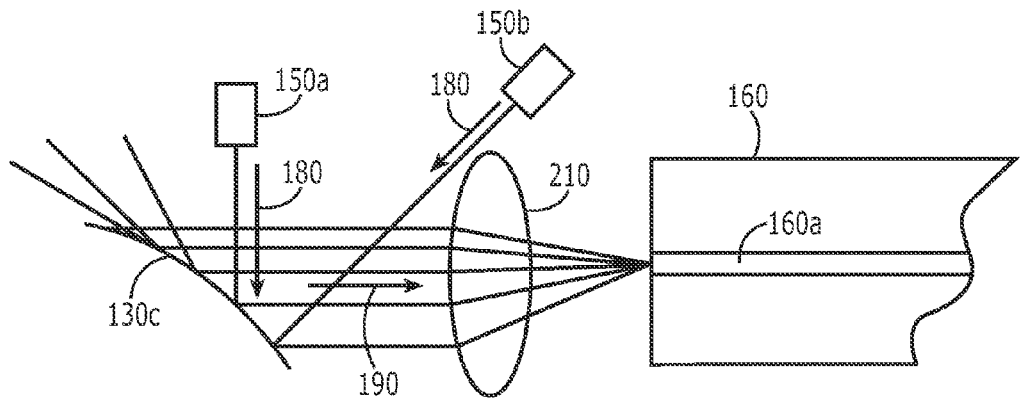
FIG. 10 is a conceptual diagram of a power splitting passive optical network including a fiber optic coupler according to various embodiments described herein.

FIG. 10 conceptually illustrates various embodiments described herein. Referring to FIG. 10, an optical source (ONU 150a) transmits an upstream beam of light 180, which impinges on curved mirror 130c. The placement of ONU 150a and the curvature of mirror 130c are designed such that the reflected beam is parallel to, and close to, the axis or core 160a of a trunk optical fiber 160. Lens 210 can focus the aggregate upstream optical signal 190 from mirror 130c such that it couples optimally into the core 160a of the trunk optical fiber 160.

As can be seen from FIG. 10, another optical source (ONU 150b), and/or additional unlabelled optical sources, located at suitable physical points with relation to the position and curvature of mirror 130c, contribute additional beams of light to the aggregate upstream optical signal 190.

Because in a PON application only one ONU transmits at a time, there may be no signal interference between these beams in the upstream fiber 160, even though all signals may nominally use the same wavelength.

In some embodiments, such as illustrated, for example, in FIGS. 3-9, a device would rotate the planar cross-section that is illustrated, about the axis of the fiber 160 into three dimensions, such that any number of ONUs could enjoy the same geometric relationship with the lens 210 and the fiber 160. In this way, even if the geometry precludes more than a very small number of sources in any given plane, the three-dimensional rotation can allow space for a large number of optical inputs.

Additional embodiments are now described in connection with FIGS. 11-13. Due to the added complexity, only block diagrams are provided.

Figure 11:
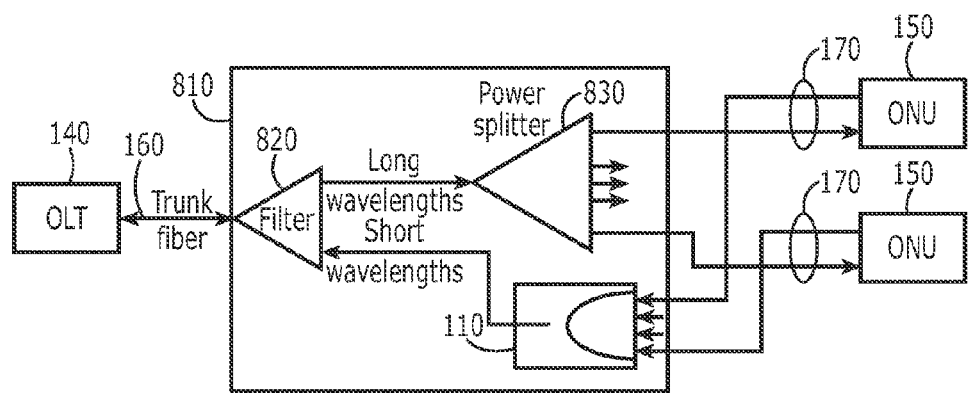
FIGS. 11-13 are block diagrams of power splitting passive optical networks including a splitter site having a fiber optic coupler according to various embodiments described herein.

Specifically, FIG. 11 illustrates a fiber optic coupler 110 according to various embodiments described herein that is integrated into a splitter site 810 to provide for transmission in both the upstream and downstream directions. As was already described, PON technology normally uses a single fiber for transmission in both directions. In a network application, the upstream and downstream directions of flow could be separated using a wavelength filter 820 as shown in FIG. 11. In FIG. 11, the OLT 140 transmits and receives a PON signal bidirectionally on a single trunk fiber 160. At the splitter site 810, the bidirectional signal is separated by the filter 820 into longer and shorter wavelength components according to the technology of the underlying PON. In FIG. 11, the longer wavelengths are used in downstream transmission but, in other embodiments, the longer wavelengths may be used for upstream transmission. Thus, as shown in FIG. 11, the longer wavelengths are passed through a power splitter 830, as may be performed conventionally.

In the upstream direction, short wavelength transmissions from the ONUs 150 are combined in a fiber optic coupler 110 according to any of the embodiments described herein.

Accordingly, FIG. 11 illustrates other embodiments of the invention wherein the housing further comprises an optical filter 820 and a power splitter 830. The optical filter 820 is optically coupled between the trunk optical fiber 160 and the power splitter 830, and is configured to direct a downstream optical signal (e.g., long wavelengths) from the trunk fiber 160 to the power splitter, and to direct the upstream optical signal (e.g., short wavelengths) from the fiber optic coupler 110 to the trunk optical fiber 160. The power splitter 830 is configured to power split the downstream optical signal (e.g., long wavelengths) that is received from the optical filter 820 and to direct a respective one of the split, reduced power, downstream optical signals to a respective one of the drop optical fibers 170. A further wavelength splitter may be provided inside the ONU 150 to again separate the upstream and downstream wavelengths.

Figure 12:
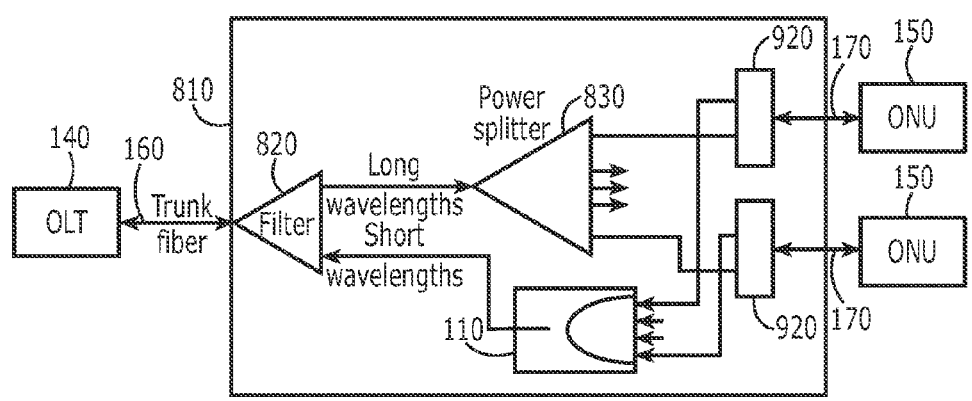

Referring now to FIG. 12, other embodiments are illustrated. Since existing optical devices in the ONU 150 generally terminate only a single fiber 170, other filters 920 may be provided in the splitter site 810 between the upstream drop fiber 170 and the power splitter 830 and the fiber optic coupler 110. More specifically, as illustrated in FIG. 12, the splitter site 810 may further comprise a plurality of second optical filters 920, a respective one of which optically couples a respective one of the drop optical fibers 170 to both the power splitter 830 and to the fiber optic coupler 110, and that are configured to direct a downstream optical signal from the power splitter 830 to the respective drop optical fiber 170, and to direct a respective upstream optical signal from a respective drop optical fiber 170 to the fiber optic coupler 110. A further wavelength splitter may be provided inside the ONU 150 to again separate the upstream and downstream wavelengths.

Figure 13:
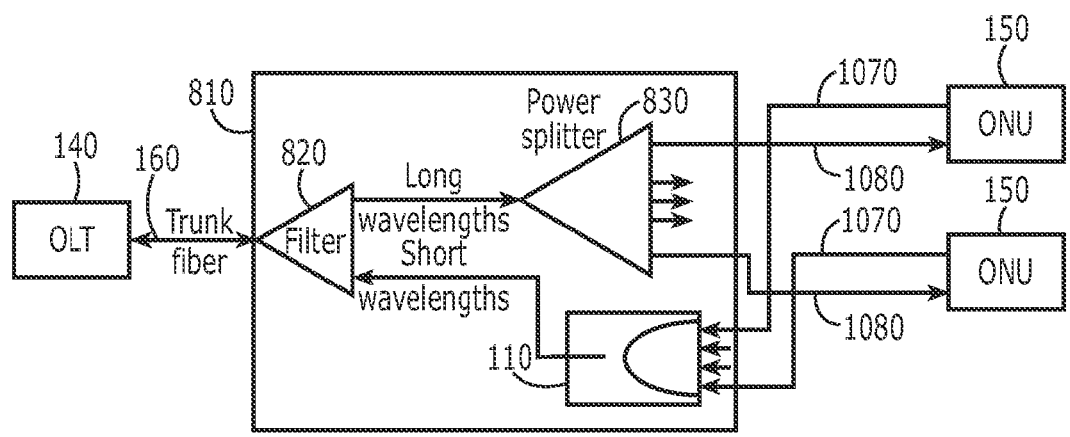

FIG. 13 illustrates yet other embodiments wherein the drop between the splitter site 810 and an ONU 150 actually includes a two fiber drop cable. Since the length of the fiber between the splitter site 810 and the ONUs 150 is likely to be quite short, it may be economically feasible to use a two-fiber drop cable. Thus, in FIG. 13, the plurality of drop optical fibers described heretofore can comprise a plurality of upstream drop optical fibers 1070 and a plurality of downstream drop optical fibers 1080. A respective upstream drop optical fiber 1070 is optically coupled between a respective one of the ONUs 150 and the fiber optic coupler 110. A respective one of the downstream drop optical fibers 1080 is also optically coupled to a respective one of the ONUs 150, and the splitter site 810 is configured to optically couple the plurality of downstream drop optical fibers 1080 to the power splitter 830 and the plurality of upstream drop optical fibers 1070 to the fiber optic coupler 110. Embodiments of FIG. 13 may provide even more cost savings in the ONU optical devices, which may no longer require their own wavelength filters.

Various embodiments described herein can reduce or minimize the upstream power losses that are associated with a conventional fiber optic splitter of a power splitting PON. Although some loss of power may be expected in real world devices constructed according various embodiments described herein, this power loss is likely to be far less than the power of two power losses associated with a conventional upstream splitter.

Moreover, the optical components of a PON may be the single greatest cost, and this technology is subject to extremely competitive price pressures. Thus, although various embodiments described herein do not address the downstream direction, which are limited by the laws of physics, the possibility of reduced component cost in the upstream direction can provide great advantages in power splitting passive optical networks. Finally, various embodiments described herein may also be used to replace fused fiber optic splitters for various applications of fiber optic couplers in various optical networks other than PON applications.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A fiber optic coupler comprising: a housing that is configured to receive a respective plurality of upstream optical signals from a respective plurality of drop optical fibers that are optically coupled to a respective plurality of optical network units in a power splitting passive optical network and to provide an aggregate upstream optical signal to a trunk optical fiber that is optically coupled to an optical line terminal in the power splitting passive optical network; at least one reflector and/or refractor in the housing that is oriented to reflect and/or refract at least one of the plurality of upstream optical signals from at least one of the plurality of drop optical fibers so as to produce the aggregate upstream optical signal that is provided to the trunk optical fiber; wherein the housing further comprises an optical filter and a power splitter; wherein the optical filter is optically coupled between the trunk optical fiber and the power splitter and is configured to direct a downstream optical signal from the trunk fiber to the power splitter and to direct the aggregate upstream optical signal from the at least one reflector to the trunk optical fiber; and wherein the power splitter is configured to split the downstream optical signal that is received from the optical filter and to direct a respective one of the split downstream optical signals to a respective one of the drop optical fibers.

2. A fiber optic coupler according to claim 1 wherein the optical filter comprises a first optical filter, the fiber optic coupler further comprising a plurality of second optical filters, a respective one of which optically couples a respective one of the drop optical fibers to the power splitter and to the at least one reflector and being configured to direct a downstream optical signal from the power splitter to the respective drop optical fiber and to direct a respective upstream optical signal from a respective drop optical fiber to the at least one reflector.

3. A fiber optic coupler according to claim 1 wherein the plurality of drop optical fibers comprises a plurality of upstream drop optical fibers, a respective one of which is optically coupled between a respective one of the optical network units and the at least one reflector, the housing also being configured to optically couple a plurality of downstream drop optical fibers to the power splitter, wherein a respective one of the downstream drop optical fibers is optically coupled to a respective one of the optical network units.

4. A fiber optic coupler according to claim 1 wherein the housing is configured to receive the trunk optical fiber and the plurality of drop optical fibers.

5. A fiber optic coupler according to claim 1 wherein the plurality of upstream optical signals are all of substantially the same wavelength and wherein the downstream optical signal is of a different wavelength from the plurality of upstream optical signals.

6. A fiber optic coupler comprising:
a housing that is configured to receive a respective plurality of upstream optical signals from a respective plurality of drop optical fibers that are optically coupled to a respective plurality of optical network units in a power splitting passive optical network, to provide an aggregate upstream optical signal to a trunk optical fiber that is optically coupled to an optical line terminal in the power splitting passive optical network, to receive a downstream optical signal from the trunk optical fiber and to provide a respective one of a plurality of split downstream optical signals to a respective one of the drop optical fibers;
at least one power splitter in the housing that is configured to power split the downstream optical signal from the trunk optical fiber to produce the split downstream optical signals; and
at least one other optical component in the housing that is configured to combine the plurality of upstream optical signals into the aggregate upstream optical signal without passing through the at least one power splitter.

7. A fiber optic coupler according to claim 6 wherein the at least one other optical component in the housing is configured to steer and focus the plurality of upstream optical signals into a core of the trunk optical fiber without passing through the at least one power splitter.

8. A fiber optic coupler according to claim 6 wherein the at least one other optical component in the housing is configured to reflect and/or refract the plurality of upstream optical signals into the aggregate upstream optical signal without passing through the at least one power splitter.

\* \* \* \* \*